United States Patent
Narancic et al.

(10) Patent No.: US 6,416,620 B1
(45) Date of Patent: Jul. 9, 2002

(54) METHOD OF REPULPING REPULPABLE AND RECYCLABLE MOISTURE RESISTANT COATED ARTICLES

(75) Inventors: Radi Narancic; Fei Wang, both of Agincourt (CA); Gary M. Freeman; Eve De LaVega-Irvine, both of Macon, GA (US)

(73) Assignees: The International Group, Inc., Wayne, PA (US); J.M. Huber Corporation, Edison, NJ (US)

( * ) Notice: Subject to any disclaimer, the term of this patent is extended or adjusted under 35 U.S.C. 154(b) by 0 days.

(21) Appl. No.: 08/999,441

(22) Filed: Dec. 29, 1997

Related U.S. Application Data

(62) Division of application No. 08/621,916, filed on Mar. 26, 1996, now abandoned.

(51) Int. Cl.[7] .................................................. D21C 5/02
(52) U.S. Cl. ................................... 162/5; 162/7; 162/8
(58) Field of Search ........................... 162/4, 5, 7, 8, 162/135, 137, 160, 172, 181.8

(56) References Cited

U.S. PATENT DOCUMENTS

| | | | |
|---|---|---|---|
| 2,984,585 A | 5/1961 | Sherman | 117/26 |
| 3,607,348 A | 9/1971 | Wray | 117/38 |
| 3,629,171 A | 12/1971 | Kremer et al. | 260/23.7 |
| 3,723,169 A | 3/1973 | Guastella et al. | 428/342 |
| 3,911,191 A | 10/1975 | Guastella et al. | 428/342 |
| 4,456,649 A | 6/1984 | Clarke | 428/285 |
| 5,131,980 A | 7/1992 | Chamblee et al. | 162/4 |
| 5,358,790 A | 10/1994 | Rif et al. | 428/486 |
| 5,454,909 A | 10/1995 | Morganelli | 162/5 |
| 5,573,636 A | 11/1996 | Sack et al. | 162/5 |
| 5,707,489 A * | 1/1998 | Von Grumbkow et al. | 162/4 |

FOREIGN PATENT DOCUMENTS

| | | |
|---|---|---|
| GB | 911527 | 11/1962 |
| GB | 1078213 | 8/1967 |
| JP | 63 211 394 A | 9/1988 |
| WO | WO 91/05107 | 4/1991 |
| WO | WO 94/18272 | 8/1994 |
| WO | WO 95/03135 | 2/1995 |
| WO | WO 95/03360 | 2/1995 |

OTHER PUBLICATIONS

Tom Garbutt, "Hot Melts Post a Complex Problem in Paper Recycling Process", CRS Sirrine Engineers, Inc., Adhesives Age, Nov. 1992.

* cited by examiner

*Primary Examiner*—Dean T. Nguyen
(74) *Attorney, Agent, or Firm*—Akin, Gump, Strauss, Hauer & Feld, L.L.P

(57) ABSTRACT

A repulpable wax containing paper product consists essentially of a hot melt formulation with an effective amount of an inorganic mineral filler such as clay. The inorganic mineral filler is in an amount which permits the article coated with the hot melt—inorganic mineral filler formulation to be repulped and recycled.

20 Claims, 2 Drawing Sheets

METHOD OF REPULPING REPULPABLE AND RECYCLABLE MOISTURE RESISTANT COATED ARTICLES

CROSS-REFERENCE TO RELATED APPLICATION

This is a division of co-pending application Ser. No. 08/621,916, filed Mar. 26, 1996, now abandoned the contents of which are hereby incorporated by reference.

FIELD OF THE INVENTION

This invention relates to hot melt composition coatings that enable paper products, more particularly, paper, paperboard, and corrugated paper containers to be repulpable and recyclable under normal repulping temperature and pH conditions when the products are treated with such hot melt compositions, but without sacrificing the moisture/water resistance of the coated products.

BACKGROUND ART

For years, hot melt coating compositions have been used to treat paper and paperboard products, which are then used as wrapping or packaging for moist, wet or fatty foods. Typical examples are the hot melt composition coated corrugated paperboard containers. These water resistant containers are used to ship and store fresh, perishable foods such as poultry, fish and meat. Often containers are filled with ice. The hot melt coating composition imparts water and moisture resistance to the containers.

Currently, hot melt treated fibrous products are not considered recyclable or repulpable under normal conditions using conventional repulping equipment and techniques. They are either burnt as an energy source or landfilled. Considering the large quantity of hot melt treated fibrous products and ecological concerns focused on the disposal of used products, it is highly desirable to discover a way so that hot melt coating compositions can be applied using conventional equipment and the treated paper, paperboard and container can be repulped and recycled under normal conditions. Most importantly, the discoveries should not sacrifice the performance of the prior art coating compositions and should remain competitive in cost.

U.S. Pat. No. 2,984,585 to Sherman is representative of these prior art coatings for paper or paper like materials which provide a barrier resistance to water vapor. In this patent, a combination of polyethylene and wax is used as a coating, the polyethylene being applied as a first coating followed by an application of a wax coating on top of the polyethylene.

U.S. Pat. No. 3,629,171 to Kremer et al. is another patent disclosing wax compositions used in curtain coating boards for food packaging applications.

While the coatings disclosed in the Sherman and Kremer et al. patents may provide moisture resistance, articles with these types of coatings are difficult if not impossible to repulp and/or recycle since the wax-containing coating cannot be separated from the paper or paper-like substrate.

In view of the ecological concerns discussed above and the difficulty with recycling or repulping certain prior art hot melt treated fibrous products, the prior art has proposed modified hot melt composition coatings to achieve both recyclability and/or repulpability.

International Publication No. WO9503360 to Sandvick et al. is concerned with a repulpable hot melt polymer/fatty acid composition for coating paper and paperboard which makes the paper products more water resistant. While paper and paperboard coated with these types of compositions may be more repulpable, they are not without their disadvantages. In general, the added fatty acid reduces the coefficient of friction of the recycled fibers, promotes undesirable oxidation of the paraffin wax component of the composition and also promotes increased coating equipment corrosion. When using fatty acids, it is not uncommon to require the use of stainless steel equipment for handling the coating composition. For repulpability, fatty acid soaps must be formed through the use of alkaline pH conditions in the repulping step, these conditions further complicating the processing equipment requirements.

International Publication No. WO9418272 to Lan also discloses a fatty acid-containing composition for wax based coating compositions to produce recyclable paper board containers. In these compositions, a fatty acid content of 10 to 30% by weight is added to the wax compositions to provide repulpability. These types of compositions are also disadvantageous for the same reasons set forth above with respect to the Sandvick et al. patent.

International Publication No. WO9105107 to Michelman is concerned with a hot melt wax coating composition for yielding recyclable paper products wherein the wax contains a non-ionic, anionic or cationic dispersant chemical (in the form of a surfactant). The surfactant is employed in these wax compositions at levels to enhance repulpability through improved wax dispersion. The addition of surfactants to wax coatings creates a number of problems, including significant cost increases, lowering the moisture resistance properties of the wax coating, primarily since the surfactants migrate to the wax coating surface and, finally, reducing the coefficient of friction of the recycled fibers.

In U.S. Pat. No. 3,607,348 to Wray et al., a double coated paper product is disclosed suitable for printing and coating with carbon transfer inks. In this paper product, a hydrophobic first coating comprising a thermoplastic material similar to wax is applied followed by a hydrophilic second coating thereon. The hydrophobic coating comprises clay and microcrystalline waxes wherein the clay loading is about 45% by weight. According to this patent, the second coating on the surface of the paper product is an aqueous-based hydrophilic coating comprising 2% by weight of sodium alginate and 0.4% of a wetting agent and water. The coatings of Wray et al. are designed to deliver printability rather than moisture barrier resistance and paraffin waxes are not used. Wray et al. also fail to recognize any recyclability or repulpability characteristics.

U.S. Pat. No. 3,723,169 to Guastella et al. describes a process for coating paper that applies a hot-melt coating. The hot-melt coating is extruded and contains as essential ingredients a heat extrudable binder and a coating pigment, e.g., clay. The heat extrudable binder is preferably polyethylene or a mixture of polyethylene and ethylene vinyl acetate. Polyethylene does not have the same barrier properties as paraffin waxes and has a melting point far too high for conventional repulping processes. The hot melt composition of Guastella et al. also requires at least 50% loading of the coating pigment and does not recognize recyclability or repulpability.

SUMMARY OF THE INVENTION

In view of the fact that the prior art has still not developed an acceptable technology for producing repulpable waxed-based coated containers or the like, a need still exists for improvements in this area of technology. Responsive to this need, the present invention provides a method of making a repulpable material utilizing a hot melt composition as well as a method of repulping such coated articles. Broadly, the present invention uses an inorganic mineral filler in combination with a hot melt formulation as a coating which is both moisture resistant and repulpable when applied to a fibrous substrate. More preferably, a clay material is used as the inorganic mineral filler.

The prior art has not taught or suggested a repulpable coated article, a method of making such an article or a method of repulping according to the instant invention.

It is a first object of the present invention to provide a moisture resistant paper product which can be repulped.

Another object of the invention is to provide a repulpable paper product that can be recycled, particularly into unblemished sheets.

A still further object of the present invention is to provide a method of coating to form a moisture resistant paper product, which does not require corrosion resistant coating equipment so that existing equipment can be used.

Yet another object of the present invention is to provide a moisture resistant coating which is transparent, repulpable and meets FDA approval for food contact.

In its broadest sense, the present invention is directed to a coated article comprising a fibrous substrate and a coating consisting essentially of a hot melt formulation having an effective amount of an inorganic mineral filler, the coating being applied to the fibrous substrate to form the coated article with an exposed moisture resistant surface, the effective amount of inorganic mineral filler making the coated article repulpable. As part of the invention, the coated article, after being used, can be repulped and, if desired, recycled.

In another aspect of the invention, a method of making the coated article is disclosed wherein a fibrous substrate is provided and a coating consisting essentially of the hot melt formulation having the effective amount of the inorganic mineral filler therewith is applied to at least one surface of the fibrous substrate to form the coated article having both the exposed moisture resistant surface and repulpability.

In its broadest sense, the coated article can take any form including a sheet form, container form or the like. The fibrous substrate can be any fibrous substrate known for use in these types of applications, including paper, paperboard, kraft, non-woven materials, cellulosic-containing materials or the like.

The inorganic mineral filler is defined as a powdered substance that is mixed or dispersed in the hot melt formulation in which it is relatively insoluble, the dispersion of the hot melt formulation with the inorganic mineral filler remaining stable at elevated temperatures, e.g. 93° C. for a minimum of 7 days, and not changing color over time, for example, 7 days at 93° C. The inorganic mineral filler should also be able to be completely and uniformly dispersed in the hot melt formulation so that the coated article with the coating applied thereto is both moisture resistant and repulpable.

More preferably, the inorganic mineral filler is a clay such as a kaolin clay, calcined clay, ball clay, smectite clays such as montmorillonite, hectorite, or the like and chemically structured clays, e.g., clay-based pigments such as Sampaque™, a chemically structured clay derived from the hydrothermal reaction of clays and sodium silicates as made by J. M. Huber Corp., Wrens, Ga., Norplex™, a chemically structured clay/$TiO_2$ composite pigment as made by Nord, Jeffersonville, Ga., Exsilon™, a chemically structured clay combining clay and catonic polymers as made by Engelhard Corp., or the like.

The hot melt formulation can be any hot melt formulation which, when combined with the inorganic mineral filler in the effective amount, achieves the desired moisture resistance and repulpability in the coated article. Preferably, the hot melt formulation is a polymer-wax formulation as defined below.

The term "hot melt formulation" as used in the present application means a thermoplastic formulation applied to the surfaces of paper products in a molten state, then allowed to cool.

The term "coating" as used in the present application means a method of applying a hot melt formulation to paper products without solvents or other carriers using any of the conventional techniques mentioned in Table III below.

The wax or waxes used in accordance with the present invention include a wide variety of waxes and resins. Such waxes include animal, vegetable and mineral waxes such as paraffin and microcrystalline, as well as synthetic waxes. As used herein, the term "wax" shall include all such waxes and such resins used in hot melt coating compositions known in the art.

More preferably, the clay as the inorganic mineral filler ranges between about 5 and about 55 weight percent of the total coating composition. All references to the weight percentage of the inorganic mineral filler are based on the weight of the total coating composition. The percentage of the clay or other inorganic mineral filler also depends on the type of coating process utilized when applying the coating. For example, using curtain coating processing, the inorganic mineral filler may range between about 30 and less than 50%. Using an impregnation type coating, about 20 to about 30% of the inorganic mineral filler may be acceptable to achieve moisture resistance and repulpability.

Preferably, when the coated article is being repulped, the repulping operation is performed under neutral pH conditions. Repulping the coated articles using neutral pH conditions permits the use of existing equipment and processes.

In the method of making the coated article, the hot melt formulation and inorganic mineral filler are first mixed to form a dispersion of the hot melt formulation containing the effective amount of the filler. This inorganic mineral filler-containing formulation is then applied to the surface of a fibrous substrate in a conventional manner to form the coated article having both moisture resistance and repulpability.

Since the coated article according to the invention is repulpable, after its use, the coated article can be repulped and the repulped fibers can then be recycled using conventional technology.

BRIEF DESCRIPTION OF THE DRAWINGS

Reference is now made to the drawings of the invention wherein.

DESCRIPTION OF THE PREFERRED EMBODIMENTS

The purpose of the instant invention is to provide a hot melt coating which yields recyclable, water resistant paper products, the coating consisting essentially of a dispersion of a hot melt coating and an inorganic mineral filler in an effective amount for repulpability of the hot melt formulation. The use of inorganic mineral fillers in these hot melt coatings is important in that raw material costs are reduced while coating properties are functionally maintained and product repulpability and/or recyclability is achieved. Recyclability is improved in that the inorganic mineral filler-containing hot melt formulation can be easily removed from fibrous substrates via screening processes after standard repulping. This avoids the introduction of wax contamination into recycling mills. This method is also more effective in removing wax than prior art techniques designed to improve repulpability by addition of surfactants or fatty acids to known wax formulations. Improving repulpability necessarily relieves the environmental pressures created by the need to recycle a greater percentage of paper based products. Until the present invention, attempts to recycle wax containing products have presented a problem for recycling mills.

Quite surprisingly, when repulping and recycling the coated article according to the invention, a level of recyclability is attained that is similar to the levels of recyclability attained with non-wax containing paper products.

Figure 1:
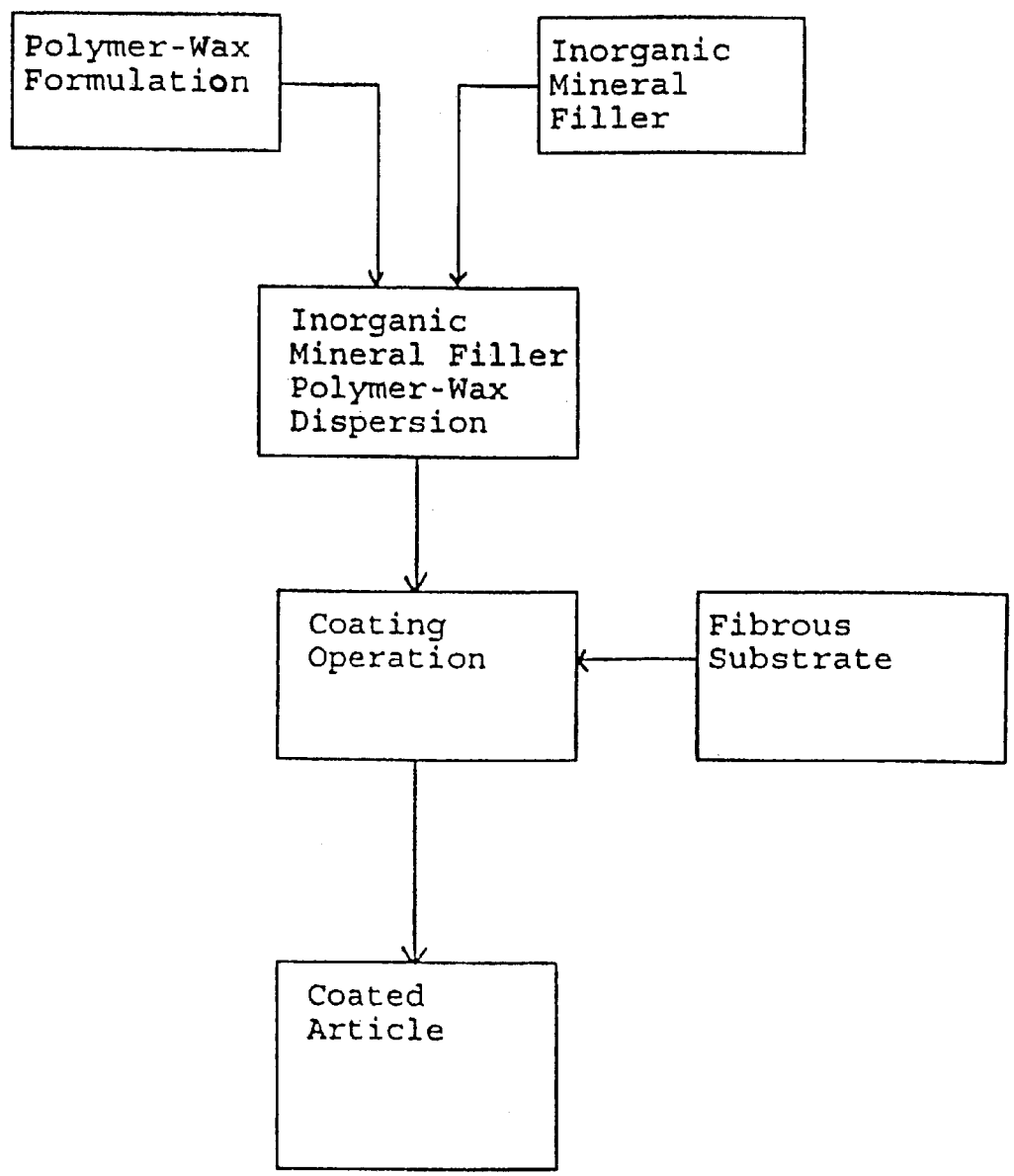
FIG. 1 is a schematic diagram detailing the inventive method of making a coated article.

With reference now to FIG. 1, an exemplary schematic details the formation of a repulpable and moisture resistant coated article. First, a polymer-wax formulation as a preferred hot melt composition is selected along with an inorganic mineral filler. These components are selected, as described below, for their ability to form a stable dispersion which can be coated onto a substrate to achieve the desired moisture resistance and repulpability. The stability of the dispersion is defined below.

The polymer-wax formulation and inorganic mineral filler are mixed together to form an inorganic mineral filler-polymer wax dispersion. To improve mixing, the inorganic mineral filler can be heated prior to combining it with the polymer-wax formulation. Moreover, it is desirable to maintain an inert gas blanket, e.g., nitrogen, argon, carbon dioxide, etc., over the polymer-wax formulation-inorganic mineral filler dispersion during mixing to minimize oxidation of the polymer-wax formulation.

This dispersion can either be stored for later use or used in a conventional coating operation to coat a fibrous substrate to produce a coated article.

Figure 2:
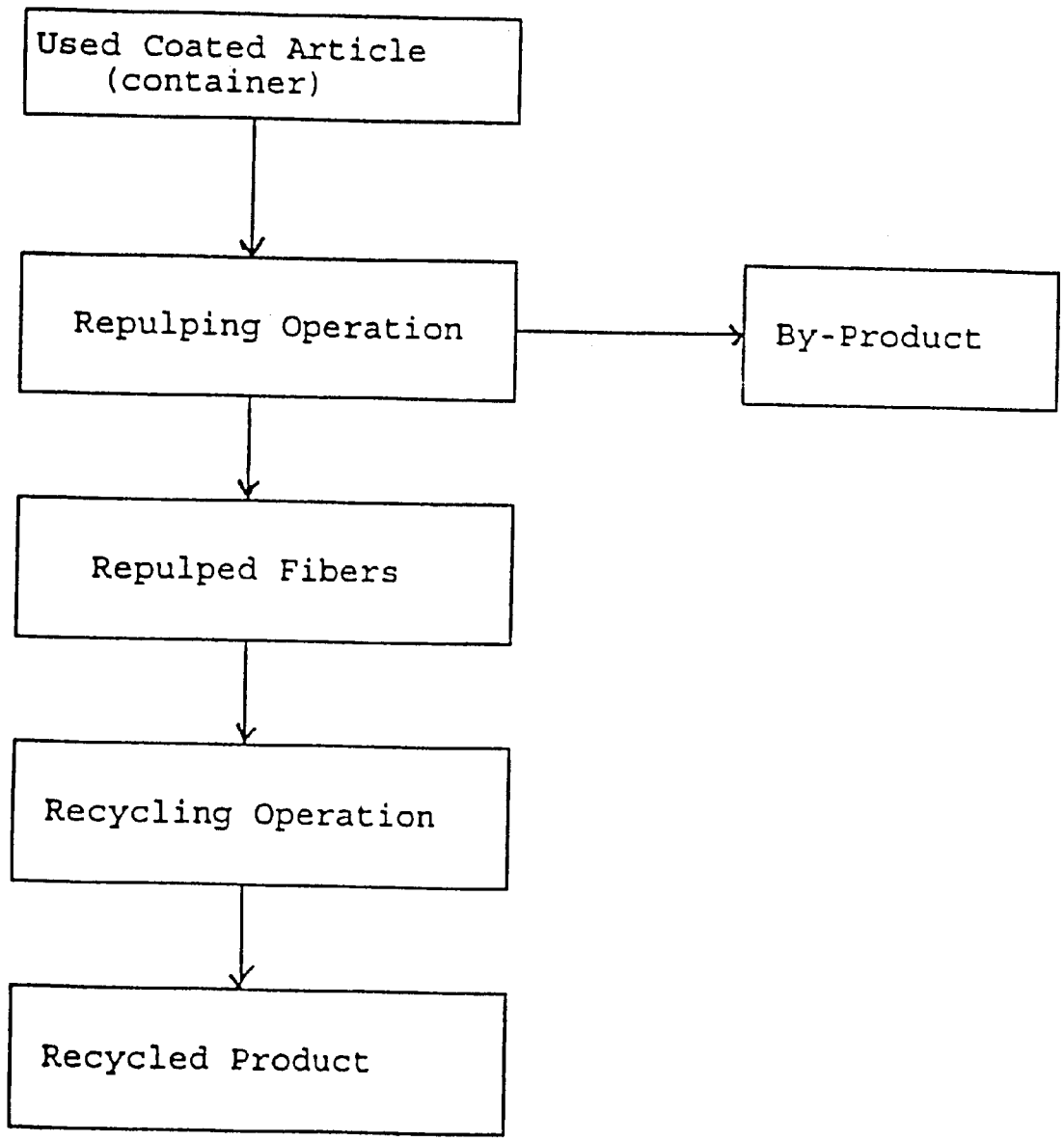
FIG. 2 is a schematic diagram detailing repulping and recycling of the inventive moisture resistant and repulpable coated article.

Referring now to FIG. 2, the coated article, whether it be panels, cartons, cups, plates, containers, miscellaneous packaging, corrugated containers or the like, is used in its intended manner and then recovered for repulping. The used coated article is fed to a conventional repulping operation which may include one or more specific steps as is known in the art. The repulping operation produces repulped fibers and a by-product mainly comprising the inorganic mineral filler with the polymer-wax formulation therewith.

The repulped fibers can then be used in a recycling operation as is known in the art to produce a recycled product.

In the coating operation of FIG. 1, the coating operation applies the dispersion at temperatures above room temperature, usually between about 30° C. and 200° C., and which, upon cooling, forms a protective barrier on the fibrous substrate, i.e., the coated article.

Application of hot melt coatings may be accomplished by processes including curtain coating, roller coating, rod coating, cascading, spraying and any other coating processes used in the art. Application temperatures are normally in the range of 30° C. to 200° C. Coating weights are typically 3 to 30 pounds/3,000 sq. ft. of substrate, preferably 15 to 25 pounds/3,000 sq. ft.

The paper industry does not uniformly nor consistently define the meaning of the term repulpability. The term repulpability as used in the present application means the capability of, or the facilitating of reducing a pulp-containing material back to pulp. Pulp is generally considered to be any material prepared by chemical or mechanical means from various materials, chiefly wood, and reused to make paper and cellulose products. These paper and cellulose products can be considered recovered paper if not thrown away, the recovered paper intended for sale, use, re-use or recycling whether such materials or by-products require subsequent separation and processing. The recovered paper is then repulped, i.e., the action, fitness or capacity to process recovered paper or cellulose products to produce a material (secondary fiber) for paper making. The secondary fiber can then be recycled.

Recyclability is also not uniformly defined throughout the paper industry. Generally, recyclability is defined as the ability to use 90% of repulped fibers to produce blemish-free materials. More broadly, recyclability is intended to include any action, fitness or capacity to process the repulped material in order to regain the material for subsequent use, i.e. not destroyed, trashed or the like. The definition described above, i.e., 90% of recovery of repulped fibers is but one way to measure recyclability and the present invention is not so limited. Depending on the recycled end product use, other levels of repulped fibers, e.g., 95%, may also produce acceptable end products.

One of the critical ingredients of the present invention is the inorganic mineral filler. As used herein, the inorganic mineral filler is defined as a powdery substance to be mixed or dispersed in a liquid in which it is relatively insoluble. The dispersion is preferably transparent and remains transparent over time so that the fibrous substrate to be coated can be first printed on without the print being obscured. The inorganic mineral filler should have a relatively low refractive index so as to be transparent, be smaller than 10 microns, be essentially insoluble in water and organic solvents and be chemically inert. The inorganic filler should be of a type that has the capability to adsorb the hot melt formulation so as to weaken the formulation's adhesion to paper fiber and provide for enhanced repulpability.

More preferably, the inorganic mineral filler should be a type which: (1) remains stable when dispersed in the hot melt formulation and does not cause accelerated oxidation of the components of the formulation; (2) does not have a deleterious effect on color over time; (3) is easy to add to the hot melt formulation; and (4) has low viscosity increase over time.

Preferred types of inorganic mineral fillers that meet these requirements include: clays (examples include: kaolin clays, calcined clays, ball clays or smectite clays such as montmorillonite, hectorite, etc.), chemically structured clays (clay-based pigments such as Sampaque™, Norplex™, Exsilon™, etc.), calcium carbonates (ground limestone or precipitated forms), dolomite, talc, mica (such as muscovite and phlogopite), alumina trihydrate (ATH), magnesium hydroxide (brucite), titanium dioxide (anatase or rutile forms), barium sulfate (barite), silicas (crystalline, precipitated or fumed) alkali metal or alkaline-earth metal aluminosilicates (crystalline forms such as zeolites, synthetic or natural, as well as amorphous, precipitated forms such as Zeolex™ and Hydrex™, both made by J. M. Huber Corp., Havre de Grace, Md., etc.) and mixtures thereof.

More preferably, the inorganic mineral fillers are kaolin clays. Table I details properties of kaolin clay which are conducive to being combined with a hot melt formulation to produce a coated article having both moisture resistance and repulpability.

TABLE I

KAOLIN CLAY PROPERTIES

| Kaolin Clays Used as Inorganic Fillers in Repulpable Hot Melt Coatings | Kaolin Clay Properties of General Use | Preferred Kaolin Clay Properties |
| --- | --- | --- |
| Clay Product Description (All in dry form): | Hydrous (Waterwashed or Airfloat Forms) & Calcined Kaolin Clays | Hydrous Waterwashed (Dry Pulverized) |
| Average Stokes Equivalent Particle Diameter (microns) (by Sedigraph Method) | 0.1 – 8.0 | 0.2 – 0.8 |
| BET Surface Area, $M^2$/gm @ 130 DEG.C | 4 – 30 | 12 – 25 |
| Hegman Grind Value | 3 – 8 | >6 |
| Oil Absorption, GMS/100 gms. | 20 – 90 | 30 – 50 |
| pH @ 28% Solids | 3 – 10 | 6 – 8 |
| Brightness, % | 65 – 95 | — |
| % Moisture (as produced) | 0 – 4.0 | <1.0 |

Clay materials as the inorganic mineral fillers are particularly preferred since they offer several significant advantages over other filler materials because of their chemical inertness and platelet-like morphology. In addition, certain clays such as kaolin clays are FDA approved so that these types of clays can be used for food contact.

The percentage of clay depends on the particular coating process and viscosity requirements. Broadly speaking, 5 to 55% clay by weight is an effective amount for maintaining moisture resistance and repulpability. 30% to less than 50% clay is desirable for curtain coatings. 20% to 30% clay is preferred for impregnation coating which uses gravure rolls for coating.

The wax or waxes used in accordance with the present invention include a wide variety of waxes and resinous compositions which can be employed in paper coating. Such waxes include animal, vegetable and mineral waxes such as paraffins and microcrystalline waxes, as well as synthetic waxes. As used herein, the term "wax" includes all waxes and resinous compositions used in hot melt coating compositions.

More specifically, hot melt coating composition of the invention may have the ingredients shown in Table II in concentration ranges as also shown in Table II.

TABLE II

| INGREDIENT | POSSIBLE CONCENTRATION RANGE (wt. %) | PREFERRED CONCENTRATION RANGE (wt. %) | MOST PREFERRED CONCENTRATION RANGE (wt. %) |
| --- | --- | --- | --- |
| Polymer | 5 to 70 | 5 to 20 | 10 to 20 |
| tackifying resin | 0 to 50 | 1 to 20 | 10 to 20 |
| microcrystalline wax | 0 to 90 | 1 to 20 | 5 to 20 |
| paraffin wax | 0 to 90 | 30 to 75 | 40 to 75 |
| anti-oxidant | 0 to 3 | 0.01 to 2.5 | 0.5 to 2.5 |
| kaolin clay | 5 to 55 | 20 to 50 | 20 to 50 |

It should be understood that when one or more of the components are selected as zero, the remaining components must add up to 100%. For example, the coating may contain some amount of wax in order to make 100%, e.g. 5% polymer, 5% clay and 90% parrafin or 5% polymer, 5% resin 5% clay, 85% wax. Of course, other combinations are possible.

Polymer

The polymer can be any or a combination of the following polymers.

Ethylene Polymers and Copolymers

Polyethylene: The melt index ranging from 0.1 to 10,000. The density between 0.91 to 0.97.

Ethylene Vinyl Acetate: EVA is a copolymer of ethylene and vinyl acetate. The weight percent of vinyl acetate can range from 5 to 50%, the melt index from 0.1 to 10,000.

Ethylene Methyl Acrylate: The weight percent of methyl acrylate ranges from 5 to 30%, the melt index from 0.5 to 150.

Ethylene Ethyl Acrylate: The weight percent of ethyl acrylate ranging from 5 to 30%, the melt index from 0.5 to 150.

Terpolymers: Ethylene vinyl acetate acrylic acid

Oxidized Polyethylene: The acid number ranging from >0 to 50.

Elastomers

Natural rubber

Butyl rubber

Styrene block copolymers

EPDM

Polyisobutylene

Polyamides

Synthetic Waxes: Produced by polymerization. Melt points range from 49° to 121° C.

Polyoropylene and Copolymers

Polypropylene: The melt index ranging from 0.4 to 35.

Amorphous Polyolefins: Polymerized from propylene and a copolymer having a softening point from 80 to 155° C. and terpolymers of propylene and copolymers.

Paraffin Wax

Paraffin wax is mainly composed of n-alkane straight chain saturated hydrocarbons with concentrations exceeding 75% and being as high as 100%. Paraffin waxes typically have a molecular weight range of 280 to 560 (C20 to C40). The melt point is usually 43 to 77° C. Paraffin waxes typically have oil contents less than <0.5%. The viscosity ranges from 3 to 8 cSt at 99° C.

Microcrystalline Wax

Microcrystalline wax is composed of isoparaffinic, naphthenic and n-alkane saturated hydrocarbons. They have a higher viscosity than paraffin wax, usually 8 to 25 cSt at 99° C. The melt point of microcrystalline waxes ranges from 54° to 99° C. The oil content of these waxes ranges from 0.5 to 12%.

Tackifying Resin

Tackifying resins comprise any or a combination of the following:

Hydrocarbon resins;

Rosins and derivatives of rosins;

Terpene resins and their derivatives;

Tackifying resins have a softening point of −10 to 130° C.

The preferred polymer-wax composition used in the present invention is characterized as having a congealing point (ASTM D-938) of about 50 to 100° C. and preferably about 60 to 70° C.; a viscosity (ASTM D-3236) of about 10 to 1000 centipoise and preferably about 155 to 195 centipoise at 150° C. The preferred polymer-wax coating is further characterized as comprising a mixture of paraffin wax, microcrystalline wax, hydrocarbon resin, ethylene vinyl acetate copolymer (EVA) and functional additives as described below. Of course, viscosity values may vary depending on the hot melt formulation and type of inorganic mineral filler selected.

The petroleum waxes, which are a mixture of paraffin and microcrystalline waxes, can be the major components of the hot melt formulation or the preferred polymer-wax coating. Paraffin waxes have a melting point from 43 to 77° C.; microcrystalline waxes have a melting point from 54 to 99° C.

The EVA copolymers should have a polymerized vinyl acetate content ranging from 5 to about 35 weight percent and a melt index ranging from 0.1 to about 1000 (ASTM D1238-62). The preferred EVA copolymers are those having a polymerized vinyl acetate content ranging from 15 to 35.0 weight percent and a melt index ranging from about 0.1 to 150.

As shown in the preferred coating above, the polymer-wax coating may also include optional resins which may be used to give the coating composition more pronounced properties, such as hot tack, increased gloss and rigidity, as desired. Such optional resins include, for example, thermoplastic materials such as hydrocarbon resins, esters, and modified rubbers such as butyl rubber and ethylene-propylene rubber, various modified polyethylenes and the like.

Additives commonly added to hot melt coatings can be incorporated into the compositions of this invention in functional amounts without departing from the scope thereof. Examples of these additives include but are not limited to: heat and ultraviolet light stabilizers, secondary plasticizers, antiblocking agents, colorants, anti-oxidants, slip agents, melt point modifiers, nucleating agents, gloss stabilizers, viscosity-index improvers, anti-scuff agents, etc. These functional additives, if used, would typically be utilized in amounts up to 5% by weight of the composition.

Dispersants and/or surfactants may be used as an optional ingredient in the hot melt formulation to facilitate the dispersing and stabilizing of filler in the inventive composition. The choice of dispersants and/or surfactants depends on their compatibility with the composition and the surface properties of the inorganic mineral filler particles. An alternative way to achieve good dispersion is to chemically modify or treat the surface of the inorganic mineral filler.

When using an EVA-containing polymer-wax formulation, the formulation can be prepared by heating the wax to a temperature above its melting point, adding ethylene-vinyl acetate copolymer, and other additives, including the inorganic mineral filler and agitating vigorously until a homogeneous hot melt is obtained. Dispersing equipment which can provide both required shearing and mixing should be used. Suitable dispersers include high-speed disk dispersers. In general, the filler is dispersed into the polymer-wax coating composition at a temperature above the melting point, up to 150° C. and preferably 10 to 300° C. higher than the melting point. The dispersing process is monitored by checking the grind of the filler. The coating composition should be stable at its application temperature for extended periods of time. No phase separation or filler sedimentation should be observed over several months. Over this time period, the amount of filler sedimentation should not exceed about 0.01% by weight of the total coating composition.

Table III relates coating techniques to application temperatures and viscosities for the coating composition of this invention.

TABLE III

| Typical application temp. and viscosities | Conventional coating techniques |
|---|---|
| 20 cP's at 100° C. | Immersion |
|  | Saturation |
|  | Impregnation |
|  | Spray coating |
| 10,000 cP's at 160° C. | Curtain coaters |
|  | Slot orifice coaters |
|  | Roll coaters (laminators) |
|  | Gravure coaters |
| 200,000 cP's at 120° C. | Calendar |
|  | Extruder |

The following example is given to illustrate specific embodiments of the present invention, but should not be construed as limiting the scope of this invention. All parts and percents are by weight.

TABLE IV

| Ingredient | Sample A | Sample B |
|---|---|---|
| Ethylene-vinyl acetate | 15.50 | 9.30 |
| Hydrocarbon resin | 7.50 | 4.50 |
| Microcrystalline wax | 7.50 | 4.50 |
| Paraffin wax | 69.47 | 41.68 |
| Anti-oxidant | 0.03 | 0.02 |
| Kaolin clay | 0.00 | 40.00 |

Sample A, Table IV, is an example of a typical polymer-wax coating composition currently used in the packaging industry. Sample B, Table IV, is an example of one coating composition according to the invention which can replace Sample A and impart repulpability/recyclability to finished products.

To provide an example of an application demonstrating improved recyclability, Sample A and Sample B were coated on kraft substrate for functional testing. Equipment used was a conventional curtain coater pilot unit. Application temperatures were in the range of 120 to 150° C.; coating weights of 20–21 pounds/3000 ft$^2$ were applied. Water vapor transmission rate, water adsorptiveness (Cobb test) and recyclability were evaluated by the methods to be described below.

Water vapor transmission rate (WVTR) was tested in close accordance with Tappi T464 method for gravimetric determination of WVTR at 38° C. and 92% RH (relative humidity). Sample A and Sample B coating test results are shown in Table V. The Sample A coating provides a typical WVTR. The Sample B coating shows a slightly higher but acceptable value. It is believed that acceptable values of WVTR range as high as 10 g/100 in$^2$/24 hrs. depending on the application. For example, containers for holding ice would require lower values, e.g. 2.0 or less, with food containers, e.g. pizza boxes, greater than 2.0.

TABLE V

| Hot Melt Coating | WVTR g/100 in²/24 hr. | Water Adsorptiveness (Cobb Test) g/m² | Repulpability/ Hand-sheet Cleanliness | % Screen Rejects |
|---|---|---|---|---|
| Sample A | 0.6 | 0.11 | Unacceptable | 10% |
| Sample B | 1.6 | 0.22 | Very Good | 4% |

Water adsorptiveness was tested in close accordance with Tappi T441 method, also known as the Cobb test. Present requirements are for a 30 minute duration. Sample A and Sample B coating test results are shown in Table V. Sample A coating provides a typical Cobb value for 30 minutes exposure to water at room temperature. Sample B coating provides a slightly higher albeit acceptable value.

To simulate commercial recyclability processes, a method was used comprising repulping the hot melt coated paper in a laboratory hydropulper at a temperature of about 40 to 60° C. and at nearly neutral to slightly alkaline (7.0–8.0) pH. 80 grams of the coated paper were cut into 2 to 3 inchwide pieces and added to 3000 ml of heated tap water in the hydropulper. The hydropulper rotor was switched on for a period of about 30 minutes. Approximately 200 grams of pulp were removed from the hydropulper and used to cast a handsheet in a standard 8 inch by 8 inch sheet mold equipped with a typical 100 mesh forming wire. The cast handsheet was couched with blotter paper and then dried on a laboratory hotplate. The handsheet was examined visually for cleanliness, e.g., coating flakes/stains, undefibered spots. The results of this examination of Sample A and Sample B coatings are also shown in Table V. The Sample B coating, containing clay, provided better repulpability characteristics and considerably cleaner handsheets than Sample A coating.

To quantify repulpability, 200 grams of fresh pulp were removed from the hydropulper and screened with several liters of water through a Valley laboratory flat screen equipped with a 0.006 inch slotted plate. The nonscreenable residue or rejects, consisting typically of coating flakes and undefibered clumps, were removed from the slotted plate, dried and weighed to quantitate the yield expressed as %; screen rejects. The results for Sample A and Sample B coatings are shown in Table V as well. The lower rejects value obtained for Sample B coatings indicate better repulpability, i.e., more complete defiberization, and better dispersibility due to the filler content.

The 4% screen rejects for Sample B parallel the percentage of screen rejects obtained when using non-wax containing recovered paper. Thus, the inventive coated article is not only repulpable but also can be recycled as easily as non wax-containing recovered paper products.

It is believed that when clay is used in curtain coated paper and a reject rate in recycling is achieved that parallels reject rates for non-wax containing paper, the clay becomes a wax carrier. Thus, even if clay is present in the recycled paper, it absorbs the wax so that the wax is not present on the paper surface. Without wax on the paper surface, the paper can be printed on easily.

It should be understood that the invention is concerned primarily with recyclable fibrous substrates, i.e., those which do not contain wet strength additives such as latex polymers, acrylics or the like which generally do not permit repulping.

As such, an invention has been disclosed in terms of preferred embodiments thereof which fulfill each and every one of the objects of the present invention as set forth hereinabove and provides a new and improved repulpable coated article, method of making and method of repulping.

Of course, various changes, modifications and alterations from the teachings of the present invention may be contemplated by those skilled in the art without departing from the intended spirit and scope thereof. Accordingly, it is intended that the present invention only be limited by the terms of the appended claims.

What is claimed is:

1. A method of repulping a coated article comprising the steps of:
    (a) providing a moisture resistant, coated article, the coated article comprising a cellulose-containing fibrous substrate and a transparent coating on the substrate, the coating consisting essentially of a thermally stable, wax-based, hot melt formulation and an inorganic mineral filler in an amount ranging from about 20% to about 50% by weight of the coating to render the coated article repulpable and recyclable; and
    (b) repulping the coated article to form repulped fibers.

2. The method of claim 1, wherein the repulping step is performed under pH conditions between about 7.0 and 8.0.

3. The method of claim 1, wherein the repulping step further comprises repulping at a temperature between 40 and 60° C.

4. The method of claim 1, wherein the repulped fibers exhibit a screen reject percentage equivalent to that obtained from a conventional repulpable non-wax containing paper article.

5. The method of claim 1, further comprising recycling the repulped fibers into a recycled product.

6. The method of claim 5, wherein the recycled product is a sheet product.

7. The method of claims 1, wherein the inorganic mineral filler is selected from the group consisting of clays, dolomite, talc, mica, alumina trihydrate, magnesium hydroxide, titanium dioxide, barium sulfate, silica and alkali metal aluminosilicates and alkaline-earth metal aluminosilicates and mixtures thereof.

8. The method of claim 7, wherein the inorganic mineral filler is a clay.

9. The method of claim 8, wherein the clay is selected from the group consisting of kaolin clays, calcined clays, ball clays, smectite clays and chemically structured clays.

10. The method of claim 8, wherein the wax-based, hot melt formulation is a clay-containing polymer-wax formulation which consists essentially of, in weight percent of the coating, about 9.3% of ethylene-vinyl acetate, about 4.5% of a hydrocarbon resin, about 4.5% of a microcrystalline wax, about 41.68% of a paraffin wax, about 0.02% of an antioxidant and about 40% kaolin clay.

11. The method of claim 1, wherein the fibrous substrate is selected from the group consisting of paper, paperboard, non-woven material, kraft, and corrugated board.

12. The method of claim 1, wherein the wax-based, hot melt formulation is a polymer-wax formulation comprising a polymer component, a tackifying resin component, a microcrystalline wax and a paraffin wax.

13. The method of claim 12, wherein the polymer of the polymer-wax formulation is selected from the group consisting of ethylene polymers and copolymers, polyamides and a rubber.

14. The method of claim 12, wherein the wax-based, hot melt formulation further comprises an antioxidant.

15. The method of claim 14, wherein the wax-based, hot melt formulation comprises, in weight percent of the coating, 5 to 20% of the polymer component, 1 to 20% of the tackifying resin component, 1 to 20% of the microcrystalline wax, 30 to 75% of the paraffin wax, and 0.01 to 2.5% of the antioxidant.

16. The method of claim 14, wherein the wax-based, hot melt formulation comprises, in weight percent of the coating, 10 to 20% of the polymer component, 10 to 20% of the tackifying resin component, 5 to 20% of the microcrystalline wax, 40 to 75% of the paraffin wax, and 0.5 to 2.5% of the antioxidant.

17. The method of claim 1, wherein the repulping is under nearly neutral to slightly alkaline pH conditions.

18. The method of claim 1, wherein the repulping is at pH conditions between about 7.0 and 8.0 and a temperature between 40 and 60° C.

19. The method of claim 1, wherein the coated article is repulpable to a degree of not having greater than 4 percent screen rejects.

20. The method of claim 1, wherein the coated article is recyclable to the extent of being able to use at least 90 percent of repulped fibers to produce blemish-free materials.

* * * * *